United States Patent
Ando et al.

[11] Patent Number: 5,887,955
[45] Date of Patent: Mar. 30, 1999

[54] BRAKE FLUID PRESSURE CONTROL APPARATUS

[75] Inventors: Hiromi Ando; Kenji Sano; Satoru Suga, all of Yamanashi-ken, Japan

[73] Assignee: Tokico Ltd., Kanagawa-ken, Japan

[21] Appl. No.: 954,398

[22] Filed: Oct. 20, 1997

Related U.S. Application Data

[63] Continuation of Ser. No. 683,111, Jul. 16, 1996, abandoned, which is a continuation of Ser. No. 556,287, Sep. 28, 1995, abandoned, which is a continuation of Ser. No. 133,505, Oct. 7, 1993, abandoned.

[30] Foreign Application Priority Data

Oct. 13, 1992 [JP] Japan ................................ 4-274661

[51] Int. Cl.⁶ .................................................. B60T 8/40
[52] U.S. Cl. ...................... 303/116.2; 303/11; 303/113.2
[58] Field of Search .................... 303/11, 116.2, 303/116.1, 115.4, 113.2, 139, 3, 20

[56] References Cited

U.S. PATENT DOCUMENTS

| | | | |
|---|---|---|---|
| 4,123,118 | 10/1978 | Sato | 303/115.1 |
| 4,783,125 | 11/1988 | Belart et al. | 303/116.1 X |
| 5,190,362 | 3/1993 | Schaefer et al. | 303/113.2 |
| 5,248,190 | 9/1993 | Sato et al. | 303/115.4 X |
| 5,303,990 | 4/1994 | Ando et al. | 303/116.1 X |
| 5,330,258 | 7/1994 | Hoshoya et al. | 303/115.4 X |

FOREIGN PATENT DOCUMENTS

| | | |
|---|---|---|
| 4004270 | 8/1991 | Germany . |
| 4237561 | 5/1993 | Germany . |

*Primary Examiner*—Lee W. Young
*Attorney, Agent, or Firm*—Biebel & French

[57] ABSTRACT

A dual function brake fluid control apparatus is presented for performing antiskid operation as well as another control operation involving control of the fluid pressure when the apparatus is not performing an antiskid operation. The apparatus is provided with a pressure relief valve having a valve body and a piston. The relief valve is forced closed by a biasing spring acting on a valve body, and when in the open state relieves the discharge pressure of a pump to the intake side of the pump. The piston closes the relief valve when the fluid pressure from the master cylinder exceeds a specific value. This configuration allows setting the discharge fluid pressure of the pump to apply fluid pressure to the wheel cylinders for non-antiskid control operations higher than that for the antiskid control operation. During an antiskid control operation, the fluid pressure relief valve also allows to maintain the discharge fluid pressure of the pump at the same value as or higher than the fluid pressure generated in the master cylinder.

2 Claims, 4 Drawing Sheets

BRAKE FLUID PRESSURE CONTROL APPARATUS

This is a continuation of Ser. No. 08/683,111 filed Jul. 16, 1996, now abandoned, which is a continuation of Ser. No. 08/133,505 filed Oct. 7, 1993, now abandoned.

BACKGROUND OF THE INVENTION

Field of the Invention

The present invention relates in general to a fluid pressure control apparatus for antiskid control purposes, and relates in particular to a fluid pressure control apparatus having a feature that the wheel cylinders can be pressurized during a control operation other than the antiskid control operation using a same pump provided for antiskid control purposes.

Background of the Invention

There are brake fluid pressure control devices to prevent wheels from locking by operating a master cylinder, a wheel cylinder and a pump through a brake fluid pressure control device (flow valve) in various ways, such as reducing the wheel cylinder pressure by draining the brake fluid from a wheel cylinder to a reservoir, or repressurizing the brake fluid in the wheel cylinder by operating a pump and pumping the brake fluid from a reservoir to the wheel cylinder.

This type of fluid pressure control device functions by switching a normally-closed valve to operate the pressure control device so as to reduce or increase the fluid pressure in the wheel cylinder. During the repressurizing phase, the pump draws the brake fluid from the reservoir and discharges the fluid through the pressure control device to the wheel cylinder. Such a pressure control device is provided with a fluid pressure relief valve for relieving the excess pressure in the pump during repressurizing phase of antiskid control operation. This relief valve is provided with a spring, a valve body and a piston. The valve body is pressed with a biasing force of the spring so as to force the valve to close. The valve body is subjected to a discharge pressure of the pump so as to open the valve. A piston of the relief valve is in contact with the valve body, and acts to close the valve body by the brake fluid pressure generated in the master cylinder. This arrangement of the relief valve prevents the unpleasant pedal kickback phenomenon by opening the pressure relief valve when the pump discharge pressure exceeds the master cylinder pressure by the amount determined by the biasing force of the spring, thereby constantly maintaining the pump discharge pressure to be slightly higher than that of the master cylinder pressure.

It has been regarded in the past that for a dual operation, i.e. an antiskid operation and other control operation involving the pressure control in the wheel cylinders, two fluid pressure control units are required. Some examples of such additional operations are traction capability to control wheel spin during acceleration or an automatic braking capability which provides a braking power consistent with the speed of the vehicle at a flick of a manual switch.

If a pressure control unit is constructed so that the condition similar to the repressurization phase of the antiskid control is duplicated, even though there is no pressure generation by the master cylinder, by drawing brake fluid from the master cylinder, it will be possible to pressurize the wheel cylinder through the pressure control unit. Such a construction would be simple, and would not be costly, and it would not only be low cost but would also be compact.

Figure 5:
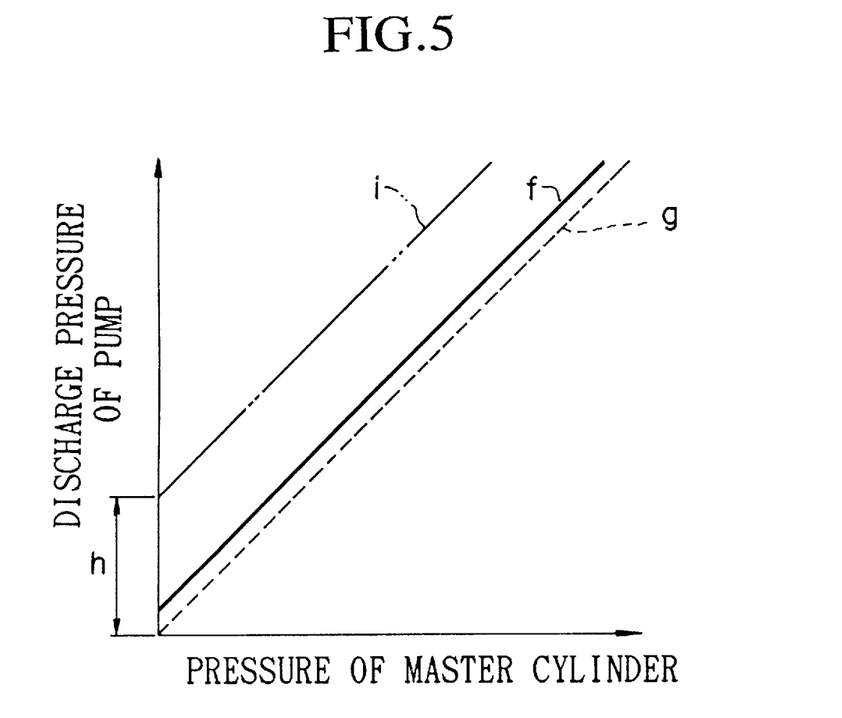
FIG. 5 is a graph showing the relationship between the brake pressure generated in the master cylinder and the discharge pressure transmitted to the flow valve in the conventional fluid pressure control device.

However, for such a dual operation device to function, it is necessary to provide a relatively high fluid pressure to the wheel cylinders when the master cylinder pressure is zero or low. It follows, therefore, that the valve opening value of the relief valve which controls the pump discharge pressure must be set relatively high. As shown in FIG. 5, the ordinary relief valve for use in antiskid control devices transmits a pressure slightly higher (line f) than that generated in the master cylinder. (The line g represents a condition of pressure generated in the master cylinder is equal to the discharge pressure of the pump.) If such a device is designed so as to transmit a relatively large pressure (amount h, in FIG. 5), the device operates in accordance with this setting, and the device constantly transmits the relatively high discharge pressure of the pump (line i in FIG. 5) to the wheel cylinders through the pressure control unit.

This presents a problem that the relatively high valve opening pressure of the pressure relief valve increases the load on the pump motor during the antiskid control operation.

SUMMARY OF THE INVENTION

The purpose of the present invention is to present a brake fluid pressure control apparatus having a dual control capability providing an antiskid control and other control operation for controlling the fluid pressure in the wheel cylinders when antiskid control is not operating. The apparatus enables a fluid pressure, for controlling the wheel cylinders in the other control function, to be set higher than the fluid pressure for antiskid control operation while avoiding overloading the pump motor.

The above objective is achieved in the apparatus having a dual control capability disposed between a master cylinder and a wheel cylinder, wherein said apparatus reduces fluid pressure in said wheel cylinder, and a pump repressurizes fluid pressure in said wheel cylinder so as to provide an antiskid control operation, and when said apparatus is not performing said antiskid control operation, said pump is used to provide other fluid pressure control operation, wherein a pressure relief valve is provided so that an excess fluid pressure of said pump is relieved to the intake side of said pump, said pressure relief valve comprising:

(a) a valve body for closing said pressure relief valve by being forced by a biasing spring, and for opening said pressure relief valve by being forces by a discharge pressure of said pump; and (b) a piston for closing said pressure relief valve by pressing on said valve body when the brake fluid pressure exceeds a specific fluid pressure value generated by said master cylinder.

The pressure relief valve of the present invention does not permit the fluid pressure to act on the piston to close the valve with the valve body until the fluid pressure generated in the master cylinder exceeds a specific value. For this reason, only force acting to close the pressure relief valve is the pressing force of the biasing spring. Therefore, by choosing the spring force appropriately, it is possible to set the pump discharge pressure on the wheel cylinders higher during the pressurization phase of the other control operation than the fluid pressure during the antiskid control operation. During the antiskid control operation, when the fluid pressure in the master cylinder exceeds a specific value, the fluid pressure acting on the piston closes the pressure relief valve. Therefore, the relief valve allows the pump discharge pressure to be equal to or slightly higher than the fluid pressure generated in the master cylinder. It follows that the load on the pump motor during the antiskid operation becomes low, thereby resolving the shortage of the discharge volume from the pump, decreasing the noise and increasing the service life of the pump.

PREFERRED EMBODIMENT OF THE INVENTION

Figure 1:
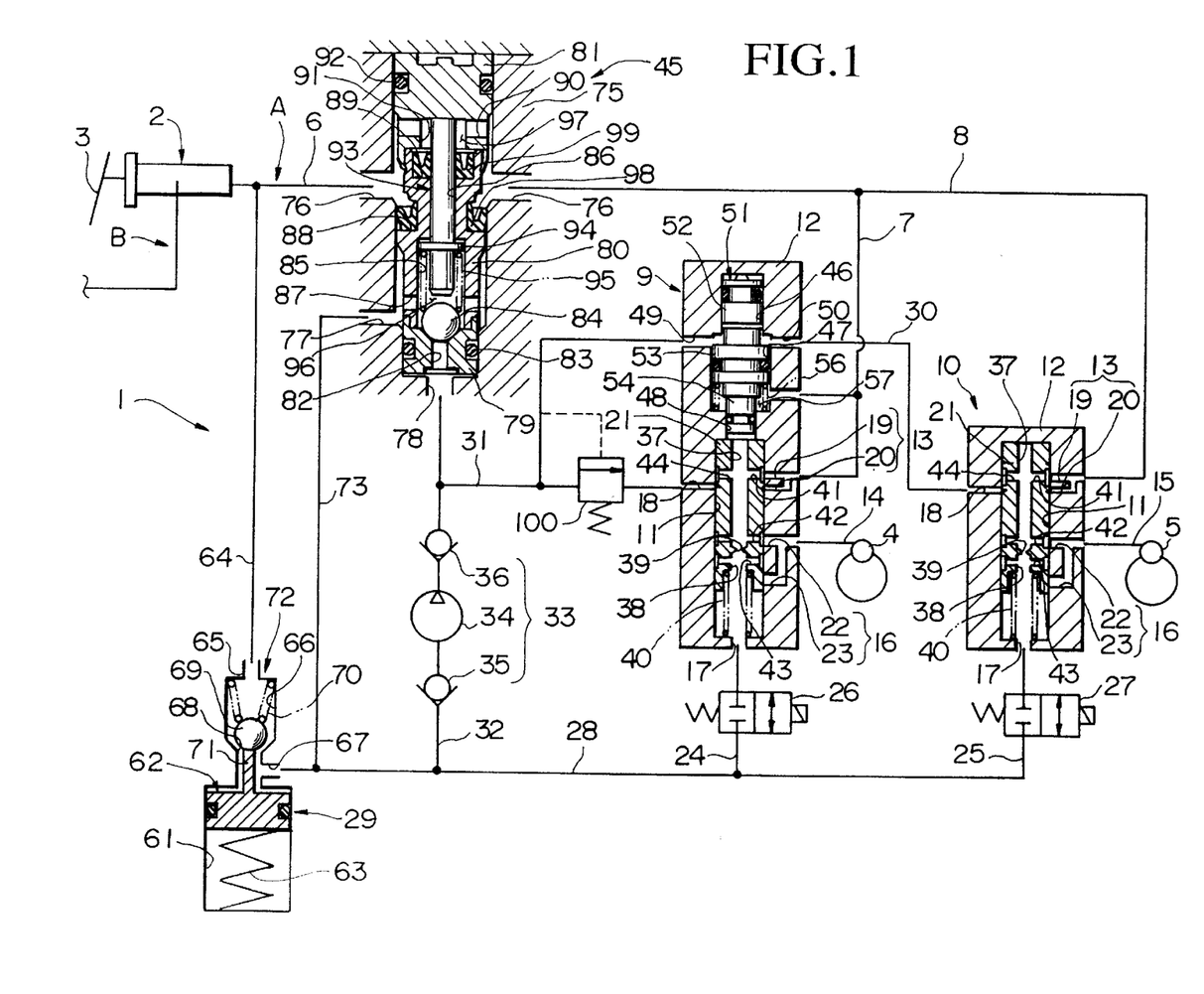
FIG. 1 is a schematic showing the overall construction of a first embodiment of the brake fluid pressure control apparatus of the present invention.

The first embodiment of the present invention will be explained in the following with reference to FIGS. 1 and 2. The first embodiment has both antiskid control and traction control capabilities. In the following explanations, "up" or "down" refers to up/down in the drawings for convenience, and does not necessarily indicate the orientation of the actual installation.

In the figures, the reference numeral 1 refers to a brake fluid pressure control apparatus, and 2 refers to a tandem master cylinder. The tandem master cylinder 2 is operatively connected to a pedal 3, and is provided with two pressure generation chambers for generating a pressure which generates a pressure in accordance with the degree of pedal pressing. The pressure generated in the pressure generation chambers is transmitted to each of the two fluid pressure control circuits A, B. The fluid pressure control circuit A, B refer to a control circuit respectively disposed in each brake line of a cross-piped brake line system.

Because the fluid pressure control circuits A, B, are constructed identically, explanation is provided only for one circuit A.

The fluid pressure control circuit A is further divided into two branched lines. One branch line communicates with a wheel cylinder 4 on a driving wheel on one line, and the other branch line communicates with a wheel cylinder 5 on a follower wheel on the other line. The wheel cylinders 4, 5 are fluid pressure devices for operating disk brakes and drum brakes, for example.

The fluid pressure control circuit A comprises: a fluid passage 6 originating from the master cylinder 2; and fluid passages 7, 8 which branch from the fluid passage 6. A flow valve 9, 10 is provided in each of the fluid passages 7, 8, respectively. Each of the flow valves 9, 10 is provided with a casing 12. The casing 12 is provided with a cylinder section 11 extending up and down, and a plurality of ports.

The plurality of ports refer to a first port 13, a second port 16, a third port 17, and a fourth port 18.

The first port 13 is disposed at right angles to the axis of the cylinder section 11 in a specific location to communicate with the master cylinder through the fluid passages 7, 8.

The second port 16 is disposed a specific distance below the first port 13 to communicate with the wheel cylinders 4, 5 through the fluid passages 14, 15.

The third port 17 is disposed on the bottom end of the cylinder section 11 along the axis of the cylinder section 11.

The fourth or pump communication port 18 is disposed opposite to the first port 13.

The first port 13 is divided into a main port 19 and a subport 20.

The main port 19 is offset a specific distance above the axis of the fourth port 28. The subport 20 is communicated with the main port 19 at the outside of the cylinder section 11, and it axis lie on approximately the same plane as the plane containing the axis of the fourth port 18. The diameter of the subport 20 is smaller than that of the main port 19. This configuration enables the fourth port 18 to be in an open position while the main port 19 is in a closed condition when a spool 21 is in the operating position (to be described later).

Also, the second port 16 comprises an upper port 22 and a lower port 23. The upper port 22 is disposed a specific distance below and in parallel with the first port 13. The lower port 23 is disposed a specific distance below and in parallel with the upper port 22, and communicates with the upper port 22 at the outside of the cylinder section 11.

The third ports 17 of the flow valves 9, 10 are connected respectively to fluid passages 24, 25. The fluid passages 24, 25 are respectively provided with normally-closed (n/c) magnetic valves 26, 27. The fluid passages 24, 25 merge together to form a fluid passage 28. The fluid passage 28 is provided with one variable volume reservoir 29. The fourth ports 18 of each of the flow valves 9, 10 are connected to each other at the fluid passage 30. A fluid passage 31 is connected to the fluid passage 30. The fluid passage 31 and the fluid passage 28 are connected at the fluid passage 32. A pump 33 is provided in the fluid passage 32. The pump 33 comprises a pump body 34, an intake valve 35 and a discharge valve 36. The pump body 34 is driven by a motor (not shown) and withdraws and discharges the brake fluid. The intake valve 35 is disposed between the pump body 34 and the fluid passage 28. The discharge valve is provided between the pump body 34 and the fluid passage 31. The pump 33 draws the brake fluid in the fluid passage 28, i.e. from the reservoir 29, and discharges it to the fluid passage 31.

A cylindrical spool 21 is slidably inserted into the cylinder section 11 of the flow valves 9, 10. The spool 21 is provided with an upper hole 37 of a given diameter, a lower hole 38 of another given diameter and a small diameter hole 39 of a smaller diameter than either the upper holes 37 or the lower hole 38. The upper hole 37 extends along the axial of the spool 21 from the top end of the spool 21 to a specific location in the middle of the spool 21. The lower hole 38 extends from the bottom end of the spool 21 coaxially with and at the same diameter as the upper hole 37 to a specific location in the middle of the spool 21. The lower hole 38 is always communicated with the third port 17. The upper hole 37 and the lower hole 38 are communicated with each other at the small diameter hole 39. The opening section of the lower hole 38 has a slightly larger diameter than other sections. In this opening section, the upper end of a spool spring 40 is inserted to press the spool 21 upwards with a certain force.

The spool 21 has a plurality of holes formed at right angles to the upper hole 37 and the lower hole 38. These holes are the first hole 41, the second hole 42, the third hole 43 and the fourth hole 44.

The first hole 41 is disposed a specific distance below the top end of the spool 21. The first hole 41 communicates the upper hole 37 and the main port 19 of the first port 13 when the spool 21 is in the stationary position (as shown in FIG. 1), i.e. the top end of the spool 21 butts up against the top end of the cylinder section 11. The first hole 41 shuts off the communication between the main port 19 of the first port 13 and the upper hole 37, when the spool 21 is in the operation position by being moved thereto by the pressure differential generated at the top and bottom of the spool 21.

The second hole 42 is disposed a specific distance below the first hole 41. The second hole 42 communicates the upper hole 37 with the upper port 22 of the second port 16 when the spool 21 is in the stationary position. The second hole 42 shuts off the communication between the upper hole 37 and the upper port 22 when the spool 21 is in the operating position.

The third hole 43 is disposed a specific distance below the second hole 42. The third hole 43 shuts off the communication between the lower hole 38 and the lower port 23 of the second port 16, when the spool 21 is in the stationary position. The third hole 43 communicates the lower hole 38 with the lower port 23 when the spool 21 is in the operating position.

The fourth hole 44 is disposed opposite to the first hole 41 and its axis coplanarly with that of the first hole 41. The fourth hole 44 shuts off the communication between the upper hole 37 and the fourth port 18, when the spool 21 is in the stationary position. The fourth hole 44 communicates the upper hole 37 with the fourth hole 18 when the spool 21 is in the operating position.

For convenience, the first hole 41 and the fourth hole 44 are described as separate parts, but since there are grooves formed on the outer periphery of the spool 21, the two holes do not function separately. It is also permissible to provide one of either the first hole 41 or the fourth hole 44. The second hole 42 and the third hole 43 also act similarly because the spool 21 is provided with grooves on its outer periphery.

To guarantee the mutual communication within the brake circuit and to guarantee fail-safe operation of a pressure relief valve 45 (to be described later), provisions are made such as the subport 20 being provided on the first port 13, and the spool 21 being provided with small grooves on its entire periphery at a specific distance above and below the first hole 41. The size of these grooves are chosen so that there would be no chance of the excess fluid from the pump 33 being returned to the master cylinder 2.

Also, when only one of the wheel cylinders 4, 5 is in the antiskid control operation, because the fourth port 18 is offset with respect to the main port 19 of the first port 13, it is possible to prevent the brake fluid discharged from the pump 33 to flow into the other fourth port 18 of the stationary spool 21 in the other flow valve of the flow valves 9, 10. By so doing, it is possible to prevent the discharged brake fluid from the pump 33 affecting the operation of the master cylinder 2. It is also possible to prevent the discharge fluid from the pump 32 affecting the master cylinder 2 by coaxially disposing the main port 19 and the fourth port 18 of each of the flow valves 9, 10, and providing a valve on the fourth port 18 which would open the fourth port 18 when the spool 21 is in the operating position.

The casing 12 of the flow valve 9 on the drive wheel is provided with: an upper hole 46 of a certain diameter disposed oppositely to the cylinder section 11; a lower hole 47 of a larger diameter than the upper hole 46; and a communication hole 48, of a smaller diameter than either of the hole 46, or the cylinder section 11, which passes through the lower hole 47 and the cylinder section 11. Also, in the vicinity of the boundary between the upper hole 47 and the lower hole 46, there are ports 49, 50 which are in the path of the fluid passage 30.

A control piston 51 is inserted into the upper hole 46, the lower hole 47 and the communication hole 48. The control piston 51 has a stepped cylindrical form, and is divided into three sections: the first axial section 52 which slidingly engage in the upper hole 46; a second axial section 53 which slidingly engages in the lower hole 47; and a third axial section 54 which slidingly engages in the communication hole 48.

There is a spring 56 of a certain biasing force, with the third axial section 54 inserted therein, disposed between the bottom surface of the second axial section 53 and a step section at the boundary between the upper hole 46 and the communication hole 48. The spring chamber 57 of the lower hole 47, in which the spring 56 is disposed, is communicated with the fluid passage 7. When the biasing force of the spring 56 alone or the additional force of the brake fluid pressure is applied to the control piston 51, the top end of the first axial section 52 abuts the upper section end of the casing 12. In this condition, the third axial section 54 is not extending into the interior of the cylinder section 11. Accordingly, the spool 21 is not forces by the control piston 51.

Under the condition that the spring chamber 57 is free from the brake fluid pressure generated at the master cylinder 2, the fluid pressure transmitted from the port 49, i.e. the discharge pressure from the pump 33, exceeds the biasing pressure of the spring 56 in the spring chamber 57, the control piston 51 moves downward. Then, the control piston 51 contacts the top end of the spool 21 by extending the third axial section 54 into the cylinder section 11 of the flow valve 9. By so doing, the control piston 51 moves the spool 21 a specific distance downward against the force of the spool spring 40. This is the operating position of the spool spring 21 during the traction control operation.

Instead of the control piston 51 and the spring 56 operated by the discharge pressure of the pump 33, it is permissible to use the following devices. A solenoid may be provided so as to attract and move the control piston 51 when the solenoid is activated. Or, a piston may be provided which would normally press the spool 21 in the operating position, and when the master cylinder 2 generates a fluid pressure, the piston releases the pressing of the spool 21.

In the spaces between the casing 12 and respectively the first axial section 52, the second axial section 53 and the third axial section 54, there is provided a sealing member to seal the respective spaces.

The reservoir 29 comprises a reservoir cylinder 61, a reservoir piston 62 and a reservoir spring 63. The reservoir piston 62 slides inside the reservoir cylinder 61 to alter the volume of the reservoir 29. The reservoir spring 63 provides a biasing force to press the reservoir piston 62 with a certain force. In the upper section of the reservoir cylinder 61, a port 65 is disposed. The port 65 is connected to the fluid passage 6 through the fluid passage 64. In the port 65, a valve body housing 66 of a larger diameter than other parts in its midsection, and a port 67 connecting to the fluid passage 28 is disposed between the reservoir cylinder 61 and the valve body housing 66.

Inside the valve body housing 66, there are a valve body 69 and a spring 70. The valve body 69 seats in the seat section 68 disposed in the valve body housing 66 on the reservoir cylinder 61 side, thus shuts off the communication between the interior of the reservoir cylinder 61 and fluid passage 64. The spring 70 is disposed opposite to the reservoir cylinder 61 of the valve body 69, and presses the valve body 69 with a certain force in the closing position, i. e., towards the reservoir cylinder 61. Here, there is a rod section 71 disposed in the upper section of the reservoir piston 62, and the rod section 71 has a smaller diameter than the diameter of the port 65, and is able to extend into the valve body housing 66. Under the condition that the reservoir piston 62 is free from the fluid pressure from the master cylinder 2 and is in a position of the least volume for the reservoir 29 (the position shown in FIG. 1), the rod section 71 presses the valve body 69. By so doing, the valve body 69 moves away from the seat section 68, and communicates the fluid passage 64 with the interior of the reservoir cylinder 61.

When the reservoir piston 62 is in the operating position by being moved by the fluid pressure from the master cylinder 2, for example, so as to alter the volume of the reservoir 29, the rod section 71 withdraws from the valve body housing 66, thereby relieving the pressure on the valve body 69. By so doing, the valve body 69 is pressed by the spring 70 and seats in the seat section 68, thereby shutting off the communication between the fluid passage 64 and the interior of the reservoir cylinder 61.

Here, under any condition, the fluid passage 28 is communicated with the reservoir cylinder 61. The valve body 69, valve body housing 66, spring 70 and the rod section 71 constitute a control valve 72. The control valve 72 may be separated from the reservoir 29 and disposed on the fluid passage 64. Instead of the control valve 72, it is possible to utilize a sensor to detect a signal from the brake pedal 3, and use the signal to trigger an electromagnetic valve.

On the fluid passage 73 which bypasses the intake side and the discharge side of the pump 33, there is disposed a pressure relief valve 45. The relief valve 45 relieves the excess pressure to the intake side of the pump 33, when the fluid pressure between the flow valves 9, 10 and the relief valve 45 exceeds a specific value.

The relief valve 45 has a cylindrical shaped housing 75. The housing 75 comprises a master cylinder communication port 76, a return or pump intake communication port 77 and the pump discharge communication port 78. The master cylinder communication port 76 is disposed at right angles to the axial direction of the housing 75 in a specific location of the housing 75. The pump intake communication port 77 is disposed a specific distance below and parallel with the master cylinder communication port 76. The pump discharge communication port 78 is disposed in the lower central section of the housing 75, and along its axial direction. The master cylinder communication port 76 is communicated with the fluid passage 6 disposed between the master cylinder 2 and the flow valves 9, 10. The pump discharge communication port 78 is communicated with the fluid passage 73 at the discharge side of the pump 33. The pump intake communication port 77 is communicated with the fluid passage 73 at the intake side of the pump 33. Inside the housing 75, there are disposed a first member 79, a second member 80 and a third member 81, successively from the side nearest to the pump discharge communication port 78.

The first member 79 has a through hole 82 of a given diameter formed along its axial direction. Between the outer periphery of the first member 79 and the housing 75, there is a seal member 83 to seal the space therebetween.

The second member 80 has its bottom section engaged with the top end of the first member 79. In the middle of the second member 80, there is a valve body insertion hole 85, of a certain diameter larger than the through hole 82, disposed along the axial direction to a specific depth from the bottom side of the housing 75. A valve body 84, to be described later, is slidably disposed inside the through hole 82. A through hole 86 having a diameter smaller than the diameter of the valve body insertion hole 85 is disposed coaxially and above the valve body insertion hole 85. On the second member 80, there is a pump intake communication hole 87 formed at right angles to the valve body insertion hole 85. The pump intake communication hole 87 is communicated with the pump intake communication port 77 of the housing 75. There are cup grooves 88, 89 formed, respectively, on the periphery of and the second member 80 at the upper side of the pump intake communication hole 87, and at the top end of the second member 80.

The third member 81 has its bottom section engaged with the top end section of the second member 80. The third member 81 is provided with a master cylinder communication hole 90 at right angles to its axial direction to communicate with the master cylinder communication port 76. The third member 81 is provided with a insertion hole 91 of a certain diameter along its axial direction. The insertion hole 91 serves to communicate the master cylinder communication hole 90 with the cup grooves 89 of the second member 80. On the outer periphery and above the master cylinder communication hole 90, there is a seal member 92 to seal the space between the third member 81 and the housing 75.

Below the valve body insertion hole 85 of the second member 80 having the first member 79 engaged therewith, there is a valve body 84 inserted. The valve body 84 receives the discharge pressure from the pump 33 transmitted through the pump discharge communication port 78 in the direction of opening the valve body 84. Above the valve body 84, there is a piston 93. The piston 93 is inserted in the through hole 86 of the second member 80 with some spacing so as to be slidable over a specific axial distance therein. Also, the piston 93 is provided with a flange section 94 of a larger diameter than the diameter of the through hole 86. The flange section 94 is inside the valve body insertion hole 85. There is a spring 95 disposed between the flange section 94 and the valve body 84. The valve body 84 is pressed by the spring 95 in the direction to close the through hole 82. The piston 93 is pressed by the spring 95 in the direction to separate from the valve body 84 and abut its top end with the third member 81.

Here, in the housing 75, the through hole 82, the pump intake communication hole 87 and the valve body insertion hole 85 are the main components of the pump communication chamber 96 which communicates with the pump 33; while the master cylinder communication hole 90, cup grooves 88, 89 are the main components of the master cylinder communication chamber 97 to communicate with the master cylinder 2.

The cup grooves 88, 89 of the second member 80 are inserted with U-shaped circular cup packings 98, 99 of an elastic material with the fold facing downward. These cup packings 98, 99 shut off the communication between the master cylinder communication chamber 97 and the pump communication chamber 96 by opening the fold when the fluid pressure in the former chamber 97 is higher than that in the latter chamber 96. When the fluid pressure in the master cylinder communication chamber 97 is lower than that in the pump communication chamber 96, the brake fluid is allowed to flow from the pump communication chamber 96 to the master cylinder communication chamber 97 through the spaces between the piston 93 and the through hole 86 and between the housing 75 and the second member 80.

Because of the presence of the cup packings 98, 99, when the pressure in the master cylinder is lowered during an antiskid operation, i. e., brake pedal is relaxed, it is possible to return the brake fluid inside the reservoir 29 to the master cylinder 2. For this reason, it becomes possible to immediately stop the brake fluid in the reservoir 29 being returned to the flow valves 9, 10, and to allow the wheel cylinders 4, 5 to follow the pressure drop in the master cylinder 2. Further, because of the presence of the control valve 72 disposed in the reservoir 29, it becomes possible to prevent the brake fluid to remain in the reservoir 29.

Further in the first embodiment, there is a valve 100 disposed in the fluid passage 30 between the fourth port 18 and the fluid passage 31. This valve 100 serves to prevent the transmission of the discharge pressure of the pump 33 to the master cylinder 2 from fourth port 18 through the main port 19, when the spool 21 of the flow valve 9 begins to move to the operating position. The valve 100 opens when the fluid pressure, generated by the pump 33, reaches a value to cause the control piston 51 to move the spool 21 to the operating position to close the main port 19 of the first port 13.

Next, the operation of the brake pressure control apparatus 1 of the first embodiment of the above described construction. In this case, the antiskid control operation is for the purpose of preventing locking of the wheels when the brakes are operated, and the traction control operation is for the purpose of preventing spinning the wheels when accelerating. Therefore, these two operations will never take place at the same time. Therefore the explanations will be provided separately and successively.

When the traction control section (not shown) detects that accelerating driving wheels are tending to spin, based on information from wheel speed sensors (not shown), the traction control section activates the pump 33. Then, the pump 33 withdraws the brake fluid from the fluid passage 64 having the control valve 72 in the open position, and discharges the brake fluid. The discharge pressure of the pump 33 operates on the second axial section 53 of the control piston 51 disposed on the flow valve 9 disposed on the driving wheel line. The discharge pressure of the pump 33 moves the control piston 51 towards the cylinder section 11, and opens the valve 100. The control valve 51 moves the spool 21 of the flow valve 9, thus communicating the fourth port 18 and the fourth hole 44. Accordingly, the discharged brake fluid is introduced into the wheel cylinders 4, 5 through the fourth port 18, the fourth hole 44, the upper hole 37, the small diameter hole 39, the lower hole 38, the third hole 43 and the lower port 23 of the flow valve 9, thereby pressurizing the wheel cylinder 4, and performing the traction control operation. In this condition, the main port 19 of the first port 13 is closed because the spool 21 is in the operating position. Therefore, there is no chance that the quantity of brake fluid which would affect the operation of the master cylinder 2 would be returned from the discharging pump. Also, regarding the flow valve 10 in the follower wheels line, the spool 21 is not in the operating position, therefore, the brake fluid discharged from the pump 33 is shut off at the fourth port 18 closed by the spool 21.

If, during the traction control operation, it becomes necessary to reduce the fluid pressure in accordance with instruction from the traction control section, the magnetic n/c valve 26 is activated to open. By so doing, the brake fluid pressure in the wheel cylinder 4 is lowered by releasing the brake fluid to the intake side of the pump 33 through the lower port 23 and the third port 17. Here, the brake fluid from the fourth port 18 to the fourth hole 44 flows at about a constant flow rate through the small hole 39. If a command to increase the pressure is again issued by the traction control section, the n/c magnetic valve 26 is closed. By so doing, the brake fluid flows into the wheel cylinder 4 as before, and the fluid pressure in the wheel cylinder 4 is increased.

To cancel the traction control operation, the traction section stops the pump 33, and activates the n/c magnetic valve 26 to open. Accordingly, the brake fluid flows out of the flow valve 9 to the fluid passage 24 through the lower port 23, the third hole 43, the lower hole 38 and the third port 17. This brake fluid is returned to the master cylinder 2 through the fluid passage 64 which is in the communication state. At this time, the piston 51 is not under the discharge pressure of the pump 33, the piston 51 releases the pressure on the spool 21.

During the traction control operation, the fluid pressure of the brake fluid discharged from the pump 33 is maintained at a value determined by the spring 95 of the relief valve 45. This is because during the traction control operation, there is no fluid pressure generated by the master cylinder 2 acting on the piston 93, and the opening value of the fluid pressure of the relief valve 45 is solely determined by the biasing force of the spring 95. The biasing force of the spring 95 is set such that a relatively high pressure necessary to operate the traction control would be transmitted to the flow valve 9.

During the normal braking operation, the brake fluid pressure generated in the master cylinder 2 is transmitted to the spring chamber 57. Therefore, the control piston 51 does not move, and does not press on the spool 21 of the flow valve 9 on the driving wheel line. Therefore, in accordance with the braking operation, the flow valves 9, 10 transmit the brake fluid pressure generated in the master cylinder 2 to each of the wheel cylinders 4, 5 through the main port 19 of the first port 13, the first hole 41, the upper hole 37, the second hole 42 and the upper port 22 of the second port 16.

Here, during the braking operation including the antiskid control operation, brake fluid pressure is generated at the master cylinder 2. For this reason, reservoir piston 62 moves, and the valve body 69 seats in the seat section 68, and the control valve 72 is always in the condition of closing the fluid passage 64.

If, during the course of such braking operation, the antiskid control section (not shown) detects, on the basis of the output information from wheel speed sensors not shown), that the wheels are tending to lock, then, in accordance with the signals from the antiskid control section, the n/c magnetic valves 26, 27 are opened. Then, the brake fluid on the lower hole 38 side of the flow valves 9, 10 flows into the reservoir 29, and as a result, a pressure differential is generated between the top and bottom sides of the spool 21. This pressure difference causes the spool 21 to move down, thus shutting off the communication between the main port 19 of the first port 13 and the first hole 41, and communicates the wheel cylinders 4, 5 with the reservoir 29 through the lower port 23, the third hole 43, the lower hole 38 and the third port 17. By so doing, the brake fluid in the wheel cylinders 4, 5 flows into the reservoir 29, leading to a decrease in the fluid pressure in the wheel cylinders 4, 5. Further, the movement of the spool 21 causes the fourth port 18 to be in the open state.

During the antiskid control operation, the pump 33 is always in operation as a result of the signal from the antiskid control section. Therefore, during the above pressure decrease phase, the brake fluid discharged from by the pump 33 is made to flow into the fourth port 18 of the flow valves 9, 10. The brake fluid is made to circulate to the reservoir 29, by the spool 21 in the operating position through the fourth port 18, the fourth hole 44, the upper hole 37, the small diameter hole 39, the lower hole 38 and the third port 17. The spool 21 moves up and down as a result of the top/bottom pressure differential of the spool 21, determined by the small diameter hole 39, and the brake fluid enters through the small diameter hole 38 into the reservoir 29, at about a constant volume flow rate.

When the antiskid control operation is to be changed from the above-described pressure decrease phase to the repressurization phase of the antiskid control operation, the n/c magnetic valves 26, 27 are closed by the signal from the antiskid control section. Then, the brake fluid discharge by the pump 33 flows into the wheel cylinders 4, 5 through the fourth port 18, the fourth hole 44, the upper hole 37, the small diameter hole 38, the third hole 43 and the lower port 23 of the flow valves 9, 10, thereby repressurizing the wheel cylinders 4, 5. In this case, the spool 21 moves up/down as a result of the top/bottom pressure differential determined by the small diameter hole 39, and the brake fluid flows into the wheel cylinders 4, 5 through the small diameter hole 39 at about a constant flow rate, thereby repressurizing the wheel cylinders 4, 5.

Figure 2:
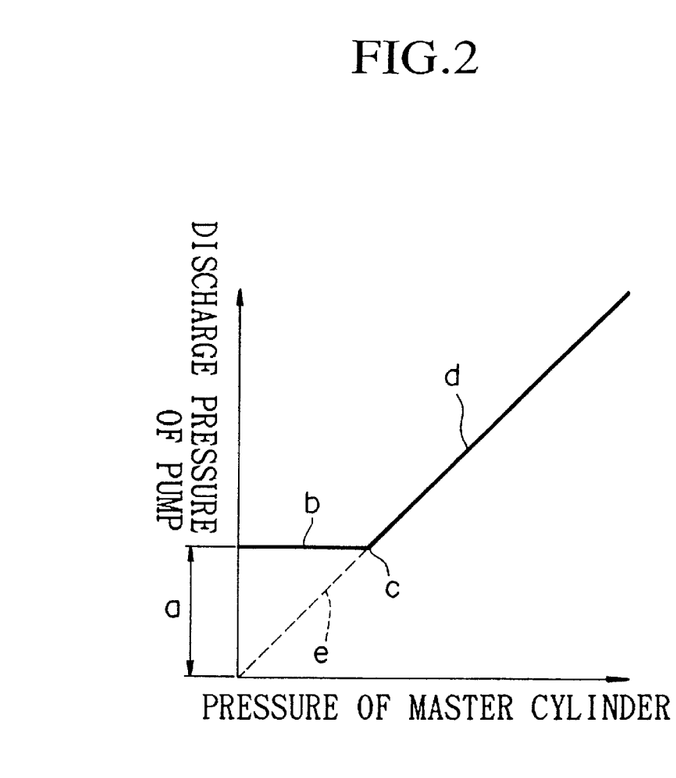
FIG. 2 is a graph showing the relationship between the brake pressure generated in the master cylinder and the discharge pressure transmitted to the flow valve in the first embodiment.

The fluid pressure of the brake fluid discharged from the pump 33, during the antiskid control operation, is maintained at a constant value governed by the biasing value of the spring 95 at a level "a" shown in FIG. 2 during the initial period of the pedal 3 operation. This period is from 0 pressure of the master cylinder 2 at the beginning of the application of the pedal 3 to a level at which the pedal 3 pressure exceeds the relief pressure determined by the biasing spring 95 in the relief valve 45, thus reaching a pressure value to move the piston 93. This constant level is shown in FIG. 2 by a line "b". When the fluid pressure from the master cylinder 2 exceeds the pressure value to move the piston 93 against the biasing pressing force of the spring 95, the piston 93 abuts against the valve body 84 as a unit body (at the point c shown in FIG. 2). During the antiskid control operation, the piston 93 is in contact with the valve body 84. In this condition, the opening pressure of the relief valve 45 is solely determined by the fluid pressure in the master cylinder 2 acting on the valve body 84 through the piston 93. Accordingly, the discharge pressure of the pump 33 equal to the fluid pressure generated in the master cylinder 2 is transmitted to the flow valves 9, 10. This is shown by a line "d" in FIG. 2. A dotted line "e" indicates a line in which the pressure generated in the master cylinder 2 is equal to the pump discharge pressure.

As described above, in the fluid pressure control apparatus 1 of the first embodiment, in which an antiskid control capability and a traction control capability are provided, by setting the biasing force of the spring 95 at a high value, it is possible to set the discharge pressure, on the driving wheel line to be traction controlled, from the pump 33 to the wheel cylinder 4 relatively high. In addition, during the antiskid control operation, when the fluid pressure generated in the master cylinder 2 exceeds the specific value set by the spring 95 (normally exceeded when antiskid control operation is undertaken), the discharge pressure from the pump 33 to the flow valves 9, 10 to be made equal to that of the fluid pressure generated in the master cylinder 2. For this reason, the load on the pump motor during the antiskid control operation can be kept minimized. Therefore, the shortage of the pump discharge volume can be resolved, the operating noise can be reduced and the service life of the pump can be increased.

After the point c in FIG. 2, to increase the discharge pressure of the pump 33 slightly more than the fluid pressure in the master cylinder 2, another spring can be provided in addition to the spring 95 between the valve body 84 and the second member 80. It is also permissible to make the pressure-receiving area of the piston 93 of to receive the master cylinder pressure larger than the pressure-receiving area of the valve body 84 for receiving the pump discharge pressure.

Next, a second embodiment of the brake fluid pressure control apparatus will be explained with reference to FIG. 2. The construction of the pressure relief valve in the second embodiment is different from that in the first embodiment. Therefore, the following description will center mainly around the difference, and the same parts are given the same reference numeral, and their explanation will be omitted.

Figure 3:
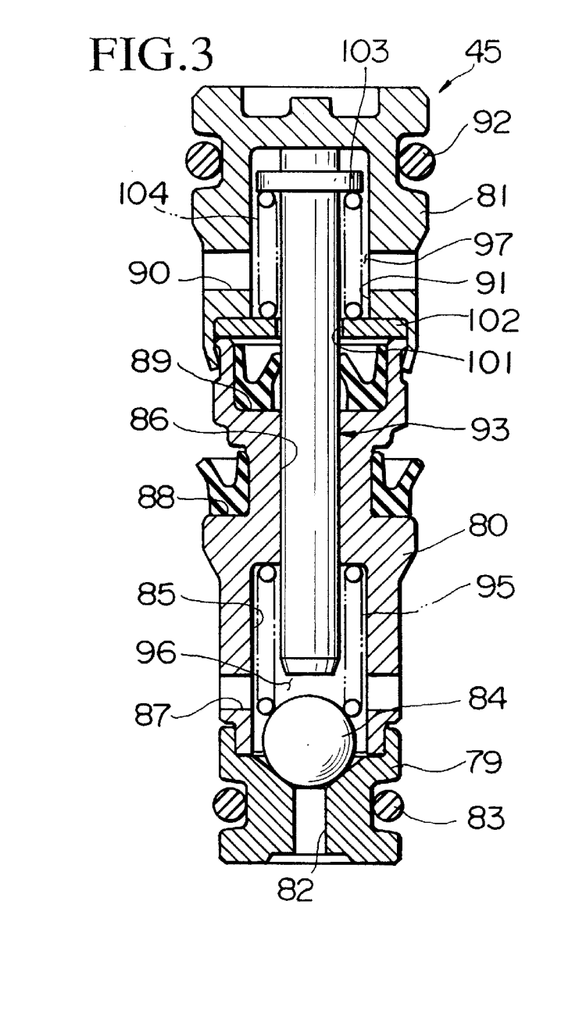
FIG. 3 is a cross sectional view showing the pressure relief valve of a second embodiment.

The third member 81 of the relief valve 45 of the second embodiment comprises a insertion hole 91 of a certain diameter for communicating the master cylinder communication hole 90 with the cup groove 89 in the second member 80 disposed a specific distance above the master cylinder communication hole 90. A stopper 102 is provided between the third member 81 and the second member 80. The stopper 102 is provided with a through hole 101 for inserting a piston 93. On the piston 93, there is provided a flange section 103 near the top end disposed inside the insertion hole 91. The diameter of the flange section 103 is made smaller than that of the insertion hole 91 but larger than that of the insertion hole 101. There is provided a piston spring 104 of a certain biasing force between the stopper 102 and the flange section 103. The piston 93 is in contact with the third member 81 and separated from the valve body 84 by the force of the biasing piston spring 104. The other end of the spring 95, whose one end is in contact with the valve body 84 and biases the valve body 84 in the closing direction, is in contact directly with the second member 80.

When the piston 93 is free from the fluid pressure generated by the master cylinder 2, the construction of the device presented above prevents the contact of the piston 93 with the valve body 84, and when the fluid pressure on the piston 93 by the master cylinder 2 exceeds the pressing force of the piston spring 104, the piston 93 moves and contacts the valve body 84. In the contacting condition, the fluid pressure generated in the master cylinder 2 acting on the piston 93 is reduced by the amount of the biasing pressing force provided by the piston spring 104. When the discharge pressure of the pump 33 exceeds the sum of the forces (F+$F_1$ –$F_2$), the valve body 84 moves and allows the excess pressure to be bled to the intake side of the pump 33, where the pressing force of the spring 95 is $F_1$, and the difference between the force F of the master cylinder fluid pressure less the pressing force $F_2$ of the piston spring 104 is (F–$F_2$).

Therefore, if the biasing force $F_1$ of the spring 95 is made larger than the biasing force $F_2$ of the piston spring 104, during the antiskid control operation, the difference between the biasing forces ($F_1$–$F_2$) and the fluid pressure generated in the master cylinder 2 acts on the valve body 84 in the direction to close the valve body 84. Thus, the discharge pressure of the pump 33 transmitted to the flow valves 9, 10 is always maintained at a value larger than the fluid pressure in the master cylinder 2, by the amount of the difference in the biasing forces ($F_1$—$F_2$). Also, during the traction control operation in which the fluid pressure of the master cylinder 2 is not applied to the piston 93, the opening pressure of the relief valve 45 is a constant value determined by the biasing force $F_1$ of the spring 95.

Therefore, during the antiskid operation when the fluid pressure generated in the master cylinder 2 exceeds the specific value of the spring 95 (normally exceeded when antiskid control is operating), the discharge pressure of the pump 33 to the flow valves 9, 10 can be made larger than the fluid pressure in the master cyliner 2 by the amount of the difference between the biasing forces of the spring 95 and the piston spring 104.

Figure 4:
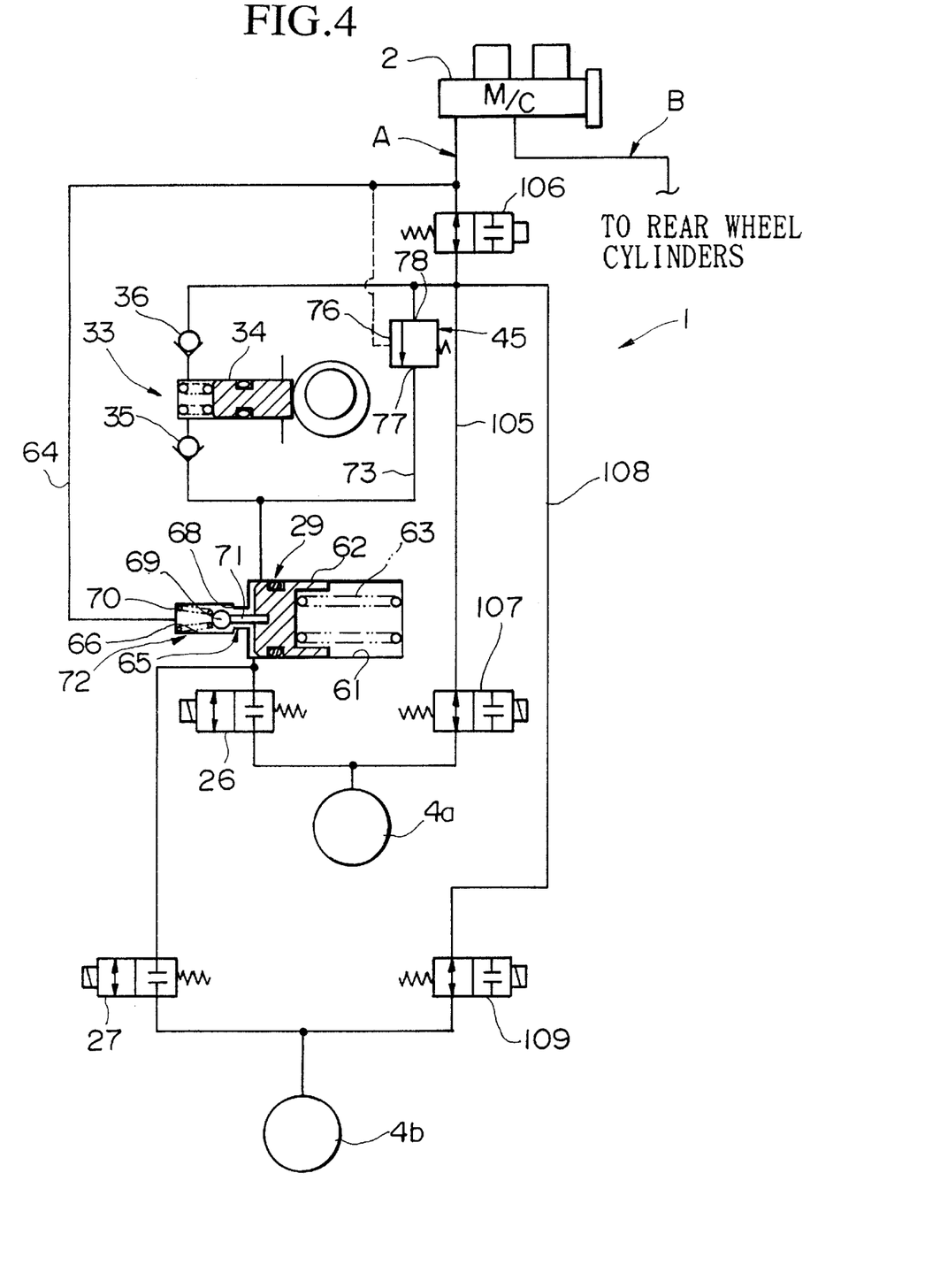
FIG. 4 is a schematic showing the overall construction of a third embodiment of the brake fluid pressure control apparatus.

Next, a third embodiment of the brake fluid pressure control apparatus will be explained with reference to FIG. 4. The third embodiment is different from the first embodiment in the adaptation of an electromagnetic valve instead of the flow valve in the first and second embodiments. Therefore, the explanations are provided centering around the difference, and the same parts are referred to by the same reference numerals, and their explanations are omitted. Also, the third embodiment relates to an application to front wheel drive vehicle, and the two front wheels share a common brake line. In other words, the brake fluid pressure control circuit A is applied to controlling the wheel cylinders of the two front wheels.

One fluid pressure generation chamber (not shown) of a master cylinder 2 and one wheel cylinder 4a of one front driving wheel is connected by a fluid passage 105 which is provided with two normally-open (n/o) magnetic valves 106, 107. The other wheel cylinder 4b of the other front driving wheel is connected to the fluid passage 108 which branches out from the fluid passage 105 disposed between the n/o magnetic valves 106 and 107. In the fluid passage 108, there is provided a n/o magnetic valve 109. The fluid passage 64 which is connected to the port 65 of the reservoir 29 is connected to fluid passage 105 at a location closer to the master cylinder 2 side than to the n/o magnetic valve 106.

The pumping body 34 is a reciprocating type pump. The discharge side of the pump 33 is connected to the fluid passage 105 between the n/o magnetic valve 106 and the n/o magnetic valve 107. There is a relief valve 45 provided in the fluid passage 73 which is a bypass passage for the intake side and the discharge side of the pump 33.

According to the brake fluid pressure control apparatus of the above described construction, during the traction control operation, the pump 33 is operated while the n/o magnetic valve 106 is closed. By so doing, the brake fluid in the master cylinder 2 is withdrawn from the fluid passage 64 through the control valve 72 (which is in the open state) and the reservoir 29, and the brake fluid is delivered to the wheel cylinder 4a, 4b through the n/o magnetic valves 107, 109 (which are in the open state) without having the brake fluid being returned to the master cylinder 2.

During the pressure reducing phase of the antiskid control operation, the n/o magnetic valves 106, 107 and 109 are closed, and the n/c magnetic valves 26, 27 are opened. By so doing, while shutting off the transmission of fluid pressure from the master cylinder 2, the brake fluid in the wheel cylinders 4a, 4b is drained into the reservoir 29, thus reducing the fluid pressure in the wheel cylinders 4a, 4b. At this time, the fluid pressure in the wheel cylinder (not shown) of the follower wheel is also reduced as necessary. Also, as in the first embodiment, the control valve 72 is closed by the fluid pressure generated by the master cylinder 2.

During the repressurizing phase of the antiskid control operation, while the n/o magnetic valve 106 is open, the pump 33 is operated with the n/c magnetic valves 26, 27 closed, and the n/o magnetic valves 107, 109 open. By so doing, the brake fluid in the reservoir 29 is withdrawn/discharged by the pump 33 to repressurize the wheel cylinders 4a, 4b. At this time, the fluid pressure in the wheel cylinder (not shown) of the follower wheel is also repressurized as necessary.

Further, by adopting the configurations of the components utilized in the first and the second embodiments for the pressure relief valve 45 in the third embodiment, similar advantageous effects can be obtained.

In the first to the third embodiments presented, the apparatus included a traction control capability, in addition to a skid control capability, which operates while the master cylinder does not generate fluid pressure. However, it is possible to design the operation so that the pump will deliver an increased amount of brake fluid to the wheel cylinders even if the fluid pressure in the master cylinder is below a specific level. Therefore, so long as the fluid volume is sufficient to pressurize the wheel cylinders, it is possible to apply the design concept presented in the present invention to vehicles equipped with an automatic braking device which generates controls in accordance with the vehicle speed, for example.

What is claimed is:

1. A brake fluid pressure control apparatus including master cylinder and a plurality of wheel cylinders, having a dual control capability including traction control and anti-skid control, said apparatus includes control circuits for each wheel cylinder, each circuit comprising a brake fluid transmission line connecting he master cylinder and the wheel cylinder through a normally opened magnetic valve, a return line connecting the wheel cylinder and a cylinder port of a reservoir through a normally closed magnetic valve, a pump line connecting said return line with the brake fluid transmission line through the reservoir and a pump, and a reflux line connecting the reservoir and the brake fluid transmission line, said apparatus further comprising:

the normally open magnetic valve being disposed in said brake fluid transmission line;

the reservoir being provided for storing the brake fluid released from the wheel cylinder during an antiskid operation, and to reflux the brake fluid to the master cylinder when fluid pressure of the stored fluid is higher than fluid pressure from the master cylinder;

the pump being connected with a cylinder port of the reservoir for withdrawing the brake fluid from the master cylinder through the reservoir and having an intake valve defining an intake side of the pump and a discharge valve defining a discharge side of the pump;

a relief valve comprising a cylinder port provided in a fluid passage which is a bypass passage for the intake side and the discharge side of the pump, a piston disposed inside of the relief valve, a valve body to close a discharge port when a fluid pressure exceeding a biasing force of a spring biasing apart the piston from the valve body is applied to a main port of the relief valve;

wherein, during the traction control operation, the fluid pressure discharged from the pump is maintained at a value determined by the spring of the relief valve and during an antiskid control operation, the brake fluid discharged from the pump is maintained at a constant value governed by the biasing value of the spring when the fluid pressure generated by the master cylinder is less than the biasing value of the spring, and when the discharge pressure generated by the master cylinder exceeds the biasing force of the spring, the discharge pressure from the pump is made equal to that of the fluid pressure generated in the master cylinder.

2. A brake fluid pressure control apparatus (1) including a master cylinder (2) and at least one wheel cylinder (4a), having a dual control capability including traction control and antiskid control, said apparatus including a control circuit (A) for said at least one wheel cylinder (4a), said control circuit (A) comprising a brake fluid transmission line (105) connecting a first normally-open magnetic valve (106) for opening and closing the transmission of brake fluid from the master cylinder (2) to the wheel cylinder (4a) through a second normally-open magnetic valve (107), a return line (28) connecting the wheel cylinder (4a) and a reservoir (29) through a normally-closed magnetic valve (26), and a pump line (31,32) connecting said reservoir (29) with the brake fluid transmission line (105) through a pump (33), a bypass line (73) which bypasses an intake side (35) and a discharge side (36) of the pump (33), and a reflux line (64) connecting the reservoir (29) and the master cylinder (2), said apparatus further comprising:

the first normally-open magnetic valve (106) being disposed for connecting the master cylinder (2) and the brake fluid transmission line (105), and the second normally-open magnetic valve (107) being disposed in said brake fluid transmission line (105);

the normally-closed magnetic valve (26) being disposed in said return line (28);

the reservoir (29) being provided for storing brake fluid released from the wheel cylinder (4a) and having a variable capacity;

a control valve (72) disposed in said reflux line (64) for closing the transmission of brake fluid through said reflux line (64) between said reservoir (29) and said master cylinder (2) when brake fluid is transmitted to said first normally-open magnetic valve (106);

a pump (33) comprising a pump body (34), an intake valve (35) disposed in said pump line (32) connecting said pump body (34) with said reservoir (29) and defining said intake side of the pump (33), and a discharge valve (36) disposed in said pump line (31) connecting said pump body (34) with said brake fluid transmission line (105) and defining said discharge side of the pump (33);

a relief valve (45) disposed in said bypass line (73) and comprising a pump intake communication port (77) provided for communicating with the intake side (35) of the pump (33), a pump discharge communication port (78) provided for communicating with the discharge side (36) of the pump (33), and a master cylinder port (76) for withdrawing brake fluid from the master cylinder (2), and further comprising a valve body (84) to control the communication of brake fluid between said pump intake communication port (77) and said pump discharge communication port (78), and a piston (93) acting in a direction to abut said valve body (84) in response to brake fluid pressure from said master cylinder (2) transmitted through said master cylinder port (76), and a spring (95) disposed between said valve body (84) and said piston (93) for biasing said valve body (84) in a direction to close said valve body (84) and for biasing said piston (93) in a direction away from the valve body (84);

wherein, in the traction control operation, during an increase in the brake fluid pressure of the wheel cylinder (4a), the brake fluid pressure is transmitted to the wheel cylinder (4a) through the brake fluid transmission line (105) by closing the first normally-open magnetic valve (106) and by activating the pump (33) to withdraw brake fluid from the master cylinder (2) to the pump line (31,32) through the reflux line (64) and the reservoir (29), and to transmit the brake fluid pressure to the wheel cylinder (4a) through the brake fluid transmission line (105) provided with said second normally-open magnetic valve (107), and wherein brake fluid pressure discharged from the pump (33) is transmitted to the pump discharge communication port (78) of the relief valve (45), the relief valve (45) closes the bypass line (73) until the valve body (84) is opened against the biasing force of the spring (95), and the brake fluid pressure of the wheel cylinder (4a) is maintained at a pressure corresponding to the biasing force of the spring (95);

in the antiskid control operation, the brake fluid pressure of the wheel cylinder (4a) is controlled by closing the first normally-open magnetic valve (106) and by activating the pump (33), and during a pressure decrease phase, the brake fluid pressure is decreased by closing the second normally-open magnetic valve (107) and by opening the normally-closed magnetic valve (26) to withdraw brake fluid from the wheel cylinder (4a) to the reservoir (29), and during a repressurization phase, while maintaining the first normally-open magnetic valve (106) closed and maintaining the pump (33) in operation, brake fluid pressure is transmitted to the wheel cylinder (4a) by opening the second normally-open magnetic valve (107) and by closing the normally-closed magnetic valve (26) to withdraw brake fluid from said reservoir (29) to the pump line (31,32) to transmit the brake fluid to the wheel cylinder (4a) through the brake fluid transmission line (105), the brake fluid discharged from the pump (33) is supplied to the pump discharge communication port (78) of said relief valve (45), the relief valve (45) shuts the bypass line (73) until the discharge pressure of the pump (33) exceeds the brake fluid pressure of the master cylinder (2) thereby pressing the piston (93) against the biasing force of the spring (95), and the brake fluid pressure transmitted to the wheel cylinder (4a) is maintained at a pressure corresponding to the brake pressure of the master cylinder (2).

* * * * *

UNITED STATES PATENT AND TRADEMARK OFFICE
CERTIFICATE OF CORRECTION

PATENT NO. : 5,887,955
DATED : March 30, 1999
INVENTOR(S) : Hiromi Ando, Kenji Sano, Satoru Suga

It is certified that error appears in the above-indentified patent and that said Letters Patent is hereby corrected as shown below:

In column 14, line 27, delete "he", insert --the--.

Signed and Sealed this

Twentieth Day of July, 1999

*Attest:*

Q. TODD DICKINSON

*Attesting Officer*  Acting Commissioner of Patents and Trademarks